US012595214B2

(12) United States Patent
Barsotti et al.

(10) Patent No.: US 12,595,214 B2
(45) Date of Patent: Apr. 7, 2026

(54) HIGH TEMPERATURE COMPOSITES AND METHODS FOR PREPARING HIGH TEMPERATURE COMPOSITES

(71) Applicant: Arkema France, Colombes (FR)

(72) Inventors: Robert Barsotti, King of Prussia, PA (US); Krysten Minnici, King of Prussia, PA (US); Stephen G Dipietro, Amherst, PA (US); Mary Calvin, Havertown, PA (US); Roderick Reber, Philadelphia, PA (US)

(73) Assignee: ARKEMA FRANCE, Puteaux (FR)

( * ) Notice: Subject to any disclaimer, the term of this patent is extended or adjusted under 35 U.S.C. 154(b) by 354 days.

(21) Appl. No.: 18/176,639

(22) Filed: Mar. 1, 2023

(65) Prior Publication Data

US 2023/0227369 A1 Jul. 20, 2023

Related U.S. Application Data

(63) Continuation-in-part of application No. PCT/IB2022/000667, filed on Nov. 15, 2022, and a continuation-in-part of application No. PCT/US2022/049962, filed on Nov. 15, 2022.

(51) Int. Cl.

*C04B 35/83* (2006.01)
*C04B 35/628* (2006.01)
*C04B 35/64* (2006.01)
*C04B 35/657* (2006.01)

(52) U.S. Cl.

CPC ........ *C04B 35/83* (2013.01); *C04B 35/62873* (2013.01); *C04B 35/62886* (2013.01); *C04B 35/64* (2013.01); *C04B 35/657* (2013.01); *C04B 2235/422* (2013.01); *C04B 2235/48* (2013.01); *C04B 2235/5248* (2013.01); *C04B 2235/5252* (2013.01); *C04B 2235/5256* (2013.01); *C04B 2235/616* (2013.01); *C04B 2235/6562* (2013.01)

(58) Field of Classification Search

CPC ... C04B 35/521; C04B 35/524; C04B 35/528; C04B 35/532

See application file for complete search history.

(56) References Cited

U.S. PATENT DOCUMENTS

| | | | | |
|---|---|---|---|---|
| 5,965,268 | A * | 10/1999 | Sastri | C04B 35/62645 252/502 |
| 10,669,659 | B2 | 6/2020 | Tierney et al. | |
| 2004/0155382 | A1 | 8/2004 | Huang | |
| 2008/0025906 | A1 | 1/2008 | Lin et al. | |
| 2011/0097575 | A1 * | 4/2011 | Pratte | B29C 70/086 428/221 |
| 2011/0124253 | A1 | 5/2011 | Shah et al. | |
| 2017/0313050 | A1 | 11/2017 | Defelice et al. | |
| 2019/0048500 | A1 | 2/2019 | Tierney et al. | |
| 2019/0322804 | A1 | 10/2019 | Louis | |
| 2021/0017089 | A1 | 1/2021 | Thrasher et al. | |

FOREIGN PATENT DOCUMENTS

JP H069270 A 1/1994

OTHER PUBLICATIONS

International Search Report issued on Feb. 2, 2023 by the European Patent Office Office in corresponding PCT Patent Application No. PCT/US2022/049962. (5 pages).

Written Opinion issued on Apr. 2005 by the European Patent Office Office in corresponding PCT Patent Application No. PCT/US2022/049962. (8 pages).

International Search Report issued on Feb. 27, 2023 by the European Patent Office Office in corresponding PCT Patent Application No. PCT/IB2022/000667. (6 pages).

Written Opinion issued on Apr. 2005 by the European Patent Office Office in corresponding PCT Patent Application No. PCT/IB2022/000667. (9 pages).

Extended European Search Report dated Apr. 19, 2022, issued by the European Patent Office in corresponding European Application No. 21306580.8-1108. (11 pages).

Gonçalves, J. et al., "Electrically Conductive Polyetheretherketone Nanocomposite Filaments: From Production to Fused Deposition Modeling", Polymers, published Aug. 18, 2018, vol. 10, No. 925. (20 pages).

International Search Report (PCT/ISA/210) and Written Opinion (PCT/ISA/237) mailed on Feb. 15, 2023, by the European Patent Office as the International Searching Authority for International Application No. PCT/US2022/049962. (16 pages).

Muhammed, F. et al: "Influence of material and process parameters on microstructure evolution during the fabrication of carbon-carbon composites: a review", Journal of Material Science, Aug. 12, 2021, pp. 17877-17914, vol. 56, No. 32. (38 pages).

(Continued)

*Primary Examiner* — Timothy Kennedy
(74) *Attorney, Agent, or Firm* — Boone IP Law

(57) ABSTRACT

A method for making a high temperature composite, which is a carbon carbon composite, carbon fiber reinforced ceramic matrix composite, ceramic fiber reinforced ceramic matrix composite, or a carbon silica composite, including: a) providing a precursor part including a resin comprising a poly(aryl ether ketone) (PAEK) and at least one reinforcing material, wherein the resin has a degree of crystallinity of 10% or more; b) pyrolyzing the precursor part to a pyrolyzed part; c) infusing a liquid second resin into the pyrolyzed part to make an infused part; and d) pyrolyzing the infused part to make the carbon carbon composite carbon fiber reinforced ceramic matrix composite, ceramic fiber reinforced ceramic matrix composite, or the carbon silica composite, optionally repeating steps c. through d. Also, a carbon carbon composite, carbon fiber reinforced ceramic matrix composite, ceramic fiber reinforced ceramic matrix composite, or carbon silica composite made by the method.

21 Claims, No Drawings

(56) References Cited

OTHER PUBLICATIONS

Pérez-Martín, H. et al., "Crystallinity studies of PEKK and carbon fibre/PEKK composites: A review", Composites Part B, Jul. 8, 2021, vol. 223, Elsevier Ltd., Amsterdam, NL. (26 pages).
U.S. Appl. No. 17/530,970, Robert J. Barsotti, filed Nov. 19, 2021.
U.S. Appl. No. 18/706,968, Robert J. Barsotti, filed May 2, 2024.
U.S. Appl. No. 18/707,026, Robert J. Barsotti, filed May 2, 2024.

* cited by examiner

HIGH TEMPERATURE COMPOSITES AND METHODS FOR PREPARING HIGH TEMPERATURE COMPOSITES

CROSS REFERENCE TO RELATED APPLICATIONS

The present application is a continuation-in-part of International Application No. PCT/IB2022/000667, filed on Nov. 15, 2022, which claims the benefit of U.S. application Ser. No. 17/530,970, filed on Nov. 19, 2021 and the benefit of European Application No. 21306580.8. The present application is also a continuation-in-part of International Application No. PCT/US2022/049962, filed on Nov. 15, 2022, which claims the benefit of U.S. application Ser. No. 17/530,970, filed on Nov. 19, 2021 and the benefit of EP Application No. 21306580.8. The entire contents of each of International Application No. PCT/IB2022/000667, International Application No. PCT/US2022/049962, U.S. application Ser. No. 17/530,970, and European Application No. 21306580.8 are hereby incorporated herein by reference in their entirety.

TECHNICAL FIELD

The present invention relates to high temperature composites, such as carbon carbon composites, carbon fiber reinforced ceramic matrix composites, ceramic fiber reinforced ceramic matrix composites, and carbon silica composites. The present invention also relates to methods for preparing high temperature composites, such as carbon-carbon composites, carbon fiber reinforced ceramic matrix composites, ceramic fiber reinforced ceramic matrix composites, and carbon silica composites.

BACKGROUND

High temperature composites such as carbon carbon composites, carbon fiber reinforced ceramic matrix composites, ceramic fiber reinforced ceramic matrix composites, and carbon silica composites, can be useful in areas such as hypersonics, solid/liquid rocket propulsion, and other defense/aerospace applications where ultra-high temperature properties are required. Industrial applications can include metal and glass processing and concentrated photovoltaics.

High temperature composites materials, including carbon composites, carbon fiber reinforced ceramic matrix composites, ceramic fiber reinforced ceramic matrix composites, and carbon silica composites have been traditionally made utilizing pitch or thermoset resins such as phenolic (such as Hexion Durite SC1008) or epoxy. Precursor parts utilizing these thermoset composites are typically made by “hand lay-up” methods requiring significant manual labor to place thermoset prepregs down. In addition to the time and cost of such labor, this manual effort also leads to human error and low quality in precursor parts. Thermoplastic composite materials have an advantage in their ability to be processed by automated methods, including automated tape placement and 3D printing. Thermoplastic tape has additional advantages versus thermoset prepregs in that refrigerated shipment and storage is typically not required.

A pyrolysis step (thermal treatment) can be used in the production of carbon-carbon composites, carbon fiber reinforced ceramic matrix composites, ceramic fiber reinforced ceramic matrix composites, and carbon silica composites. The pyrolysis can be implemented to eliminate volatiles and/or non-carbon organic elements in the composites (such as in the polymer matrix) and retain carbon elements in the form of carbonaceous char.

But pyrolysis steps can sometimes take hundreds of hours, with an additional day for graphitization processing at temperatures in excess of 1600-2000 C. This process is then repeated several times, leading to long lead times for finished parts. Each additional re-infusion plus pyrolysis cycle is labor intensive and time consuming. Additionally, at each cycle there is the possibility that errors or defects could lead to an unacceptable final object. Therefore, it is desirable to reduce the number of cycles required to achieve a fully dense part. Higher char yields allow this process to be shortened because the part is closer to fully solid after the first pyrolysis cycle thereby lessening the number of needed cycles. Typically, phenolic based solutions can only provide char yields of 50-70%. Many other (non PAEK) thermoplastic solutions provide char yields of less than 65%.

Defects to be avoided, most notably occurring during the pyrolyzing steps, are dimensional changes of the part being pyrolyzed, in particular bloating of the part and/or cracks appearing within the part.

The inventions described herein, which utilize sufficiently crystallized poly (aryl ether ketone) (PAEK), unexpectedly overcome at least some of the above mentioned problems.

PAEK polymers, are high performance semi-crystalline polymers having high melting points, extremely high thermal properties, outstanding chemical resistance and flame resistance, and high modulus and strength. By following embodiments of the invention, it is possible to make carbon carbon composites, carbon fiber reinforced ceramic matrix composites, ceramic fiber reinforced ceramic matrix composites, and carbon silica composites using a thermoplastic resin. The thermoplastic resin allows automated methods to make precursors parts thereby saving time and money while improving quality and having unexpectedly high char yields, such as char yields from 70% to 80%, up to 85%, up to 90%, and even up to 95% and higher. Pyrolysis cycles can be sped up as the PAEK materials show a single decomposition point thereby alleviating the need for long hold cycles at multiple temperatures often seen with thermoset resins. The surprisingly high char yields also enable fewer pyrolysis/infusion steps than other methods, thereby savings days and even weeks of production time. In certain embodiments, the carbon carbon composites, carbon fiber reinforced ceramic matrix composites, ceramic fiber reinforced ceramic matrix composites, and carbon silica composites can be made in a total process time of less than about 50 h, 60 h, 70 h, 80 h, 90 h, 100 h, 110 h, 120 h, 130 h, 140 h, 150 h, 160 h, 170 h, 180 h, 190 h, 200 h, or any ranges between the specified values.

The Applicant has also surprisingly discovered that, thanks notably to the selection of a sufficiently crystallized poly (aryl ether ketone) (PAEK), it is possible to utilize carbon carbon composite, carbon fiber reinforced ceramic matrix composite, ceramic fiber reinforced ceramic matrix composite, and carbon silica composite precursors that combine the advantages of high char yields and high mechanical performance of PAEK polymers with low dimensional changes of the part being pyrolyzed.

SUMMARY

The present invention deals with a method for making a high temperature composite, which is a carbon-carbon composite, a carbon fiber reinforced ceramic matrix composite, ceramic fiber reinforced ceramic matrix composite, or a carbon silica composite, comprising:

a. providing a precursor part comprising a resin comprising a poly(aryl ether ketone) (PAEK) and at least one reinforcing material, wherein the resin has a degree of crystallinity of 10% or more;

b. pyrolyzing the precursor part to a pyrolyzed part;

c. infusing a liquid second resin into the pyrolyzed part to make an infused part; and d. pyrolyzing the infused part to make the carbon carbon composite, carbon fiber reinforced ceramic matrix composite, ceramic fiber reinforced ceramic matrix composite, or the carbon silica composite, optionally repeating steps c. through d. one or more times.

According to some preferred embodiments, the degree of crystallinity is determined by Differential Scanning calorimetry, on first heat, with a temperature ramp of 20° C./min.

According to some embodiments, during the pyrolyzing, a temperature within a chamber increases to a peak temperature of about 1000° C. or more.

According to some embodiments, during the pyrolyzing, a temperature within a chamber increases at a rate from 1° C./h to about 20° C./h during said pyrolyzing, and optionally said pyrolyzing is maintained for a period of time at one or more temperatures.

According to some embodiments, during the pyrolyzing, a temperature within a chamber increases to a peak temperature of about 1000° C. or more, and said temperature within the chamber increases one or more times at a rate from 1° C./h to about 20° C./h during said pyrolyzing, and optionally said pyrolyzing is maintained for a period of time at one or more temperatures.

According to some embodiments, during the pyrolyzing of the precursor part, the temperature within the chamber increases one or more times at a rate of less than 10° C./h between 450° C. and 600° C., and is optionally maintained for a period of time at one or more temperatures between 450° C. and 600° C., temperatures included.

According to some embodiments, during the pyrolyzing of the precursor part, the temperature within the chamber increases one or more times at a rate of 10° C./h or more at temperatures below 400° C. and/or above 650° C.

According to some embodiments, during the pyrolyzing of the precursor part, the temperature within the chamber increases one or more times at a rate of less than 10° C./h between 450° C. and 600° C., and is optionally maintained for a period of time at one or more temperatures between 450° C. and 600° C., temperatures included, the temperature within the chamber increases one or more times at a rate of 10° C./h or more at temperatures below 400° C. and/or above 650° C.

According to some embodiments, the liquid second resin comprises one or more of pitch, benzoxazines, furfural, polyester, vinylester, acrylic, and phenolics.

According to some embodiments, the precursor part of step (a) is made by: melt processing the resin comprising the poly(aryl ether ketone) and the at least one reinforcing material. The melt processing may comprise one or more of injection molding, extrusion, roto-molding, compression molding, filament winding, pultrusion, and fused filament fabrication printing, and preferably comprises one or more of injection molding, roto-molding, compression molding.

According to some embodiments, the precursor part of step (a) is made by:

a1) providing one or more tapes made of a fibrous material impregnated with a resin comprising a poly(aryl ether ketone) (PAEK) and optionally containing one or more reinforcing additives, or providing one or more fabrics made by co-weaving a fibrous material with a fiber comprising PAEK and optionally containing one or more other reinforcing additives; and a2) processing the provided tape(s) or fabrics via one or more the following methods: hand-layup, automated tape placement, 3D printing, filament winding, needle punching, and other methods of Z-axis reinforcement followed by one or more compression molding, vacuum bag consolidation, autoclave consolidation, and in-situ consolidation, to make the precursor part.

According to some embodiments, the precursor part of step (a) is made by:

a1) processing an aligned reinforcing material, a resin comprising a PAEK, and optionally other reinforcing additives, to make an aligned reinforcing material PAEK composition, to create a fabric, prepreg, or tape comprising the aligned reinforcing material and impregnated PAEK, a2) processing the fabric, prepreg, or tape comprising the aligned reinforcing material and impregnated PAEK via hand-layup, automated tape placement, 3D printing, filament winding, or needle punching, or other methods of Z-axis reinforcement followed by compression molding, vacuum bag consolidation, autoclave consolidation, in-situ consolidation to make a precursor object.

According to some embodiments, the reinforcing material comprises one or more reinforcing additives chosen among a carbonaceous additive, a chopped fiber, an inorganic additive, or mixtures thereof; a fibrous material comprising long fibers, continuous fibers, or mixtures thereof; or mixtures thereof.

According to some embodiments, the reinforcing material comprises a carbonaceous additive being one or more of carbon fiber, carbon nanotubes, graphite, graphene, carbon whisker, a fullerene, carbon black, carbon flake, buckyballs and mixtures thereof.

According to some embodiments, the reinforcing material comprises a chopped, long, or continuous fiber being one or more of carbon, glass, silica, boron, natural fibers, polymeric fibers and mixtures thereof.

According to some embodiments, the reinforcing material is a long or continuous carbon fiber, or a long or continuous glass fiber.

According to some embodiments, the PAEK(s) may be chosen from:

a polyether ketone ketone, also known as PEKK; a PEKK comprises one or more repeat units of formula: -Ph-O-Ph-C(O)-Ph-C(O)—;

a polyether ether ketone, also known as PEEK; a PEEK comprises one or more repeat units of formula: -Ph-O-Ph-O-Ph-C(O)—;

a polyether ketone, also known as PEK; a PEK comprises one or more repeat units of formula: -Ph-O-Ph-C(O)—;

a polyether ether ketone ketone, also known as PEEKK; a PEEKK comprises one or more repeat units of formula: -Ph-O-Ph-O-Ph-C(O)-Ph-C(O)—;

a polyether ether ether ketone, also known as PEEEK; a PEEEK comprises one or more repeat units of formula: -Ph-O-Ph-O-Ph-O-Ph-C(O)—;

a polyether diphenyl ether ketone, also known as PEDEK; a PEDEK comprises one or more repeat units of formula: -Ph-O-Ph-Ph-O-Ph-C(O)—;

and mixtures thereof; and copolymers comprising at least two of the abovementioned repeat units, in which: Ph represents a phenylene group and —C(O)— represents a carbonyl group, each of the phenylenes possibly being, independently, of the ortho (1-2), meta (1-3) or para-(1-4) type, preferentially being of meta or para type.

According to some embodiments, the poly(aryl ether ketone) (PAEK) is a poly(ether ketone ketone) essentially consisting of, or consisting of, a terephthalic repeating unit and an isophthalic repeating unit, the terephthalic repeating unit having the formula ("T unit"):

(I)

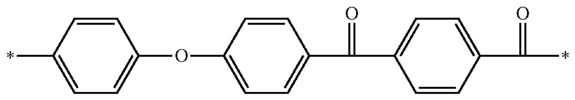

the isophthalic repeating unit having the formula ("I unit"):

(II)

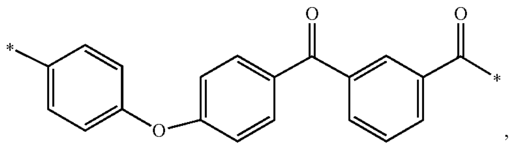

, wherein the Formula I: Formula II (T:I) isomer ratio in the polyetherketoneketone ranges advantageously from 50:50 to 85:15, and preferably from 52:48 to 78:22.

The present invention also deals with a carbon carbon composite, carbon fiber reinforced ceramic matrix composite, ceramic fiber reinforced ceramic matrix composite, or carbon silica composite made by the method herein presented.

The present invention also deals with a carbon carbon composite, carbon fiber reinforced ceramic matrix composite, ceramic fiber reinforced ceramic matrix composite, or carbon silica composite made by the method herein presented.

DETAILED DESCRIPTION

Embodiments of the disclosure relate to methods for preparing high temperature composites, such as carbon carbon composites, carbon fiber reinforced ceramic matrix composites, ceramic fiber reinforced ceramic matrix composites, and carbon silica composites. Embodiments of the disclosure also relate to carbon carbon composites, carbon fiber reinforced ceramic matrix composites, ceramic fiber reinforced ceramic matrix composites, and carbon silica composites made by the disclosed methods.

As used herein, the term "about" means±10% of the noted value. By way of example only, at least "about 50 percent" could include from at least 45 percent to and including at least 55 percent.

The word "comprising" is used in a manner consistent with its open-ended meaning, that is, to mean that a given product or process can optionally also have additional features or elements beyond those expressly described. It is understood that wherever embodiments are described with the language "comprising," otherwise analogous embodiments described in terms of "consisting of" and/or "consisting essentially of" are also contemplated and within the scope of this disclosure.

As used herein, the term "aligned" means where >75% of objects have at least one of their major axis oriented)(±5° in the same direction, as measured using images from optical microscopy of cross sections of the composites.

As used herein, the term "char yield" refers to residual carbon content measured by weight remaining after pyrolysis, and can be determined as set forth in the Examples herein.

As used herein in the context of the composite, the term "% solid" means the percent (%) of density of pyrolyzed part compared to a theoretical fully dense part containing no vacancies or voids. The density of the fully dense part can be calculated by the Rule of mixtures of the matrix material (carbon or ceramic) and the fibrous material (glass, ceramic or carbon).

$$D=d1a+d2(1-a)$$

Where

D=density of the fully dense part d1=density of the fibrous material (glass, ceramic or carbon)

a=weight fraction of the fibrous material (glass, ceramic or carbon)

d2=density of the matrix material (carbon or ceramic)

The density of the pyrolyzed part can be experimentally measured by dividing its mass by its volume.

As used herein, the term "composite" means material comprising at least two different and/or distinct components. For example, and without limiting, carbon-carbon composites may comprise a carbon matrix (e.g., graphitic) with carbon fibers. A carbon fiber reinforced ceramic matrix composite may comprise a ceramic matrix (e.g., SiC) with carbon fibers. A ceramic fiber reinforced ceramic matrix composite may comprise a ceramic matrix (e.g., SiC) with ceramic fibers. A carbon silica composite can comprise a carbon (typically graphitic) matrix with glass/silica fibers.

As used herein, the term "high temperature", when used in the expression high temperature composite, means and refer to a temperature of or above about 1000° C., at which the composite is able to be used without detrimental degradation, As used herein, the term "pyrolyzing" means to enact a chemical change to a material via the application of heat, causing some, substantially all, or all non-carbon or non-inorganic elements of the materials to volatize away. In the present invention, the chemical change of the precursor generally occurs at a temperature of at least 250° C., and notably at a temperature of at least 400° C.

As used herein, the term "infuse" (or "infusing") means to cause a matrix to be penetrated with a liquid resin, and can fill in voids or vacancies.

As used herein, the term "chopped" refers to fibers that are not continuous and have lengths of about <20 mm, preferably of about <15 mm, preferably of about <10 mm and most preferably of about <5 mm.

As used herein, the term "bloating" means the dimensional change of a part when pyrolyzed, and can be measured notably using the thickness (smallest dimension in a dimensional-space) as set forth in the Examples herein. It is to be highlighted that the highest dimensional change generally occurs along the thickness of a given part.

As used herein, the term "degree of crystallinity" refers to the weight amount of crystallized resin in the precursor part compared to the total weight of the resin (amorphous and crystallized) of the provided precursor part. Preferably, notably when the precursor part is highly loaded with reinforcing material, the assessment of the degree of crystallinity can be carried out by determining the enthalpy of melting ΔH of the resin of the precursor part by Differential Scanning Calorimetry (DSC), according to ISO 11357-3, on first heat at 20° C./min. It is generally known by the skilled person for a given resin, annealed in order to reach a high degree of crystallinity, the correlation of a reference melt enthalpy $\Delta H_{ref}$ according to ISO 11357-3, on first heat at 20° C./min and a reference degree of crystallinity % $C_{ref}$, as measured by wide-angle X-ray scattering. If the data is not present in the literature, the skilled person may have to carry out the correlation himself/herself with a neat crystallized resin. The degree of crystallinity of the precursor part % C is calculated as follows: % $C=\Delta H^*(\% C_{ref}/\Delta H_{ref})$.

A reference degree of crystallinity % $C_{re}f$ of a neat resin, and in some cases the degree of crystallinity % C of the precursor part itself, may be measured by wide-angle X-ray scattering (WAXS), on a device of Nano-inXider® type, with the following conditions:

Wavelength: main $K\alpha 1$ line of copper (1.54 angstroms).

Generator power: 50 kV-0.6 mA.

Observation mode: transmission

Counting time: 10 minutes.

A spectrum of the scattered intensity as a function of the diffraction angle is thus obtained. This spectrum makes it possible to identify the presence of crystals when peaks are visible on the spectrum in addition to the amorphous halo.

In the spectrum, it is possible to measure the area of the crystalline peaks (designated AC) and the area of the amorphous halo (designated AH). The proportion by mass of crystalline resin (notably PAEK) in the resin (notably PAEK) is then estimated using the ratio (AC)/(AC+AH).

In the spectrum, it is possible to measure the area of the crystalline peaks (designated AC) and the area of the amorphous halo (designated AH). The proportion by mass of crystalline resin (notably PAEK) in the resin (notably PAEK) is then estimated using the ratio (AC)/(AC+AH).

Poly(aryl ether ketone)(s) (PAEK(s))

As used herein, the term "polyaryl ether ketone", known by its acronym "PAEK", includes repeating units having the following formulae:

$$(\text{—Ar—X—}) \text{ and } (\text{—Ar}_1\text{—Y—}),$$

in which:

- Ar and $Ar_1$ each denote a divalent aromatic radical;
- Ar and $Ar_1$ may preferably be chosen from 1,3-phenylene, 1,4-phenylene, 1,1'-biphenylene divalent in positions 3,3',1,1'-biphenyl divalent in positions 3,4',1,4-naphthylene, 1,5-naphthylene and 2,6-naphthylene;
- X denotes an electron-withdrawing group; it may preferably be chosen from the carbonyl group and the sulfonyl group;
- Y denotes a group chosen from an oxygen atom, a sulfur atom or an alkylene group, such as —$(CH_2)$— and isopropylidene.

In these units X and Y, at least 50%, preferably at least 70% and more particularly at least 80% of the groups X are a carbonyl group, and at least 50%, preferably at least 70% and more particularly at least 80% of the groups Y represent an oxygen atom.

According to a preferred embodiment, 100% of the groups X may represent a carbonyl group and 100% of the groups Y may represent an oxygen atom.

Advantageously, the PAEK(s) may be chosen from:

- a polyether ketone ketone, also known as PEKK; a PEKK comprises one or more repeat units of formula: -Ph-O-Ph-C(O)-Ph-C(O)—;
- a polyether ether ketone, also known as PEEK; a PEEK comprises one or more repeat units of formula: -Ph-O-Ph-O-Ph-C(O)—;
- a polyether ketone, also known as PEK; a PEK comprises one or more repeat units of formula: -Ph-O-Ph-C(O)—;
- a polyether ether ketone ketone, also known as PEEKK; a PEEKK comprises one or more repeat units of formula: -Ph-O-Ph-O-Ph-C(O)-Ph-C(O)—;
- a polyether ether ether ketone, also known as PEEEK; a PEEEK comprises one or more repeat units of formula: -Ph-O-Ph-O-Ph-O-Ph-C(O)—;
- a polyether diphenyl ether ketone, also known as PEDEK; a PEDEK comprises one or more repeat units of formula: -Ph-O-Ph-Ph-O-Ph-C(O)—;
- and mixtures thereof; and
- copolymers comprising at least two of the abovementioned repeat units,
- in which: Ph represents a phenylene group and —C(O)— represents a carbonyl group, each of the phenylenes possibly being, independently, of the ortho (1-2), meta (1-3) or para-(1-4) type, preferentially being of meta or para type.

In particular embodiments, the PAEK may be a PEKK essentially consisting of, or consisting of, a terephthalic repeating unit and an isophthalic repeating unit, the terephthalic repeating unit having the formula ("T unit"):

(I)

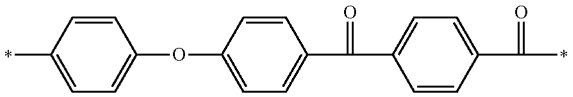

the isophthalic repeating unit having the formula ("I unit"):

(II)

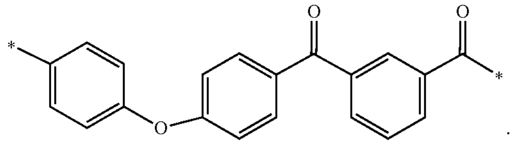

For a polymer of a given family, the term "essentially consisting of repeating unit(s)" means that the repeating unit(s) represent a molar proportion of from 95% to 99.9% in the polymer. In addition, the term "consisting of repeating unit(s)" means that the repeating unit(s) represent a molar proportion of at least 99.9%, ideally of 100%, in the polymer.

The "T unit" may also be written: -A-C(=O)—B—C(=O)—, and the "I unit" may also be written: -A-C(=O)-D-C(=O)—, where A is a p,p'-Ph-O-Ph- group, Ph is a phenylene radical, B is p-phenylene, and D is m-phenylene.

According to the invention, when the PAEK is a PEKK, the Formula I: Formula II (T:I) isomer ratio in the polyetherketoneketone ranges advantageously from 50:50 to 85:15. The isomer ratio can be easily varied as can be desired to achieve a certain set of properties, e.g., by varying the relative amounts of the different monomers used to make the polyetherketoneketone. These T:I isomer ratios enable to both maximize the char yield and minimize the precursor part dimensional deformation of the pyrolyzed part.

In preferred embodiments, notably in order to mitigate at most bloating, the polyetherketoneketone copolymer can have a T:I isomer ratio of 52:48 to 78:22.

In preferred embodiments, the polyetherketoneketone copolymer can have a T:I isomer ratio of 55:45 to 75:25.

In some embodiments, the polyetherketoneketone can have a T:I isomer ratio of about 55:45 to about 65:35, notably about 60:40.

In some other embodiments, the polyetherketoneketone can have a T:I isomer ratio of about 65:35 to about 75:25, notably about 70:30.

Suitable polyetherketoneketones are sold under the brand name KEPSTAN® supplied by Arkema.

In particular embodiments, the PAEK may be a polymer consisting essentially of, or even consisting of:

a repeat unit of formula:

(III)

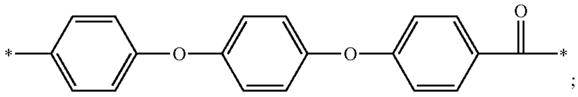

;

and a repeat unit:

(IV)

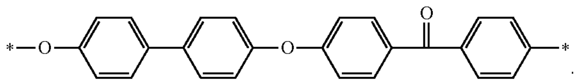

.

In certain embodiments, the PAEK copolymer can have a molar ratio of unit (III) to unit (IV) of 55:45 to 75:25.

In certain embodiments, the PAEK copolymer can have a molar ratio of unit (IV) to unit (III) of 55:45 to 75:25.

In particular embodiments, the PAEK may be a polymer consisting essentially of, or consisting of:

a repeating unit of formula:

(III)

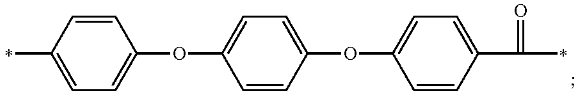

;

and a repeating unit of formula:

(V)

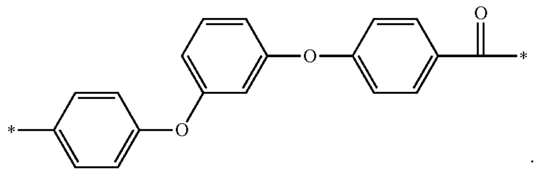

.

In certain embodiments, the PAEK copolymer can have a molar ratio of unit (III) to unit (V) of 55:45 to 75:25.

In certain embodiments, the PAEK copolymer can have a molar ratio of unit (V) to unit (III) of 55:45 to 75:25.

In particular embodiments, the PAEK may be a polymer consisting essentially of, or consisting of the repeating unit of formula (III).

Some polyaryletherketone polymers present higher char yields than others and/or lower bloating than others when pyrolyzed in comparable conditions. That is a reason why polyether ketone ketone, notably PEKK having a T:I ratio of 50:50 to 85:15, preferably 55:45 to 78:22, is preferably used over a copolymer consisting of the repeating unit of formula (III).

Reinforcing Material

The reinforcing material may be an additive, a fibrous material, or a mixture thereof.

In certain embodiments, the reinforcing material can be present in the provided precursor part in an amount of about 0.1%, 0.5%, 1%, 5%, 10%, 15%, 20%, 25%, 30%, 35%, 40%, 45%, 50%, 55%, 60%, 65%, 70%, 80% by weight or any ranges between the specified values, based on the total weight of the resin and reinforcing material of the provided precursor part.

When the reinforcing material is a reinforcing additive, it means for the present invention that the reinforcing material is discrete. It notably does not encompass long fibers, continuous fibers, or other materials considered as fibrous material. Among fibers, the reinforcing additive notably does not encompass fibers having a length of >20 mm, or in some embodiment fibers having a length of >15 mm, or of >10 mm, or of >5 mm. The advantage of using reinforcing additives to make the precursor part is that it enables to increase the char content of the pyrolyzed part and improves its mechanical properties compared to a comparative part which would be made of only a polyaryletherketone. At the same time, a precursor part comprising a PAEK and at least one reinforcing additive is much easier to process than a precursor part which would be made of a PAEK with long, continuous fibers, or other materials considered as fibrous material.

In certain embodiments, the reinforcing material is a reinforcing additive. It can be present in an amount of from about 0.1% to about 70% by weight based on the weight of the resin of the provided precursor part. In certain embodiments, the reinforcing additive can be present in an amount of from about 1% to about 60% by weight of the total weight of the resin and reinforcing additive. In certain embodiments, the reinforcing additive can be present in an amount of from about 5% to about 50% by weight of the total weight of the resin and reinforcing additive.

In preferred embodiments, the reinforcing additive can be present in an amount of between 20% and 45%, notably of 25% to 40%, based on the total weight of the resin and the reinforcing additive of the provided precursor part.

In certain advantageous embodiments, the reinforcing additive can be one or more of a carbonaceous additive, a chopped fiber, dispersing agents, and an inorganic additive or mixtures thereof.

In certain embodiments, the carbonaceous additive can be one or more of carbon fiber, carbon nanotubes, graphite, graphene, carbon whisker, a fullerene, carbon black, carbon flake, and buckyballs and mixtures thereof. In certain embodiments, the carbonaceous additive may be aligned.

In certain embodiments, the carbonaceous additive can have a length of from about 0.1 mm to 10 mm, from about 0.5 mm to 9 mm, or from about 1 mm to 8 mm. In certain embodiments, the carbonaceous additive can have a length of about 0.1 mm, 0.5 mm, 1 mm, 2 mm, 3 mm, 4 mm, 5 mm, 6 mm, 7 mm, 8 mm, 9 mm, 10 mm, and any ranges between the specified values. In certain embodiments, the carbonaceous additive can have a diameter of from about 0.1 μm to 10 μm, from about 0.5 μm to 9 μm, or from about 1 μm to 8 μm. In certain embodiments, the carbonaceous additive can have a diameter of about 0.1 μm, 0.5 μm, 1 μm, 2 μm, 3 μm, 4 μm, 5 μm, 6 μm, 7 μm, 8 μm, 9 μm, 10 μm, and any ranges between the specified values. The length of additive can be measured via optical microscopy before melt compounding. The diameter of additive can be measured via scanning electron microscopy.

In certain embodiments, the reinforcing additive can be a chopped fiber. In certain embodiments, the chopped fiber comprises one or more of carbon, glass, silica, boron, natural fibers, and polymeric fibers and mixtures thereof. In certain embodiments, the natural fibers can be one or more of cellulose, bamboo, hemp, and jute. In certain embodiments, the polymeric fibers can be one or more of polyamide, polyimides, polyaramid, polyurethane, polyester, and polyurethane, and mixtures thereof.

In certain embodiments, the chopped fiber is a chopped carbon fiber. The one or more carbon fibers can have a fiber length of from about 0.1 mm to 10 mm, from about 0.5 mm to 9 mm, or from about 1 mm to 8 mm. In certain embodiments, the chopped carbon fiber can have a fiber length of about 0.1 mm, 0.5 mm, 1 mm, 2 mm, 3 mm, 4 mm, 5 mm, 6 mm, 7 mm, 8 mm, 9 mm, 10 mm, and any ranges between the specified values. In certain embodiments, the chopped carbon fiber can have a diameter of from about 0.1 μm to 10 μm, from about 0.5 μm to 9 μm, or from about 1 μm to 8 μm. In certain embodiments, the chopped carbon fiber can have a diameter of about 0.1 μm, 0.5 μm, 1 μm, 2 μm, 3 μm, 4 μm, 5 μm, 6 μm, 7 μm, 8 μm, 9 μm, 10 μm, and any ranges between the specified values. The length of the chopped carbon fiber can be measured via optical microscopy. The diameter of chopped carbon fiber can be measured via scanning electron microscopy.

One preferred embodiment is directed to a precursor part essentially made of chopped carbon fibers in a PEKK matrix having a T:I ratio of 50:50 to 85:15, at a loading level of chopped carbon fibers of 10-45%, or 15-40%, or 20-35% by weight based on the total weight of the PEKK matrix and chopped carbon fibers.

More preferred embodiments are directed to a precursor part essentially made of chopped carbon fibers in a PEKK matrix having a T:I ratio of 55:45 to 78:22, notably a T:I ratio of about 60:40 or of about 70:30, at a loading level of chopped carbon fibers of 20% to 45% by weight, notably of 25% to 40% by weight, based on the total weight of the PEKK matrix and chopped carbon fibers.

In certain embodiments, the chopped fiber is a chopped glass fiber. The one or more glass fibers can have a fiber length of from about 0.1 mm to 10 mm, from about 0.5 mm to 9 mm, or from about 1 mm to 8 mm. In certain embodiments, the chopped glass fiber can have a fiber length of about 0.1 mm, 0.5 mm, 1 mm, 2 mm, 3 mm, 4 mm, 5 mm, 6 mm, 7 mm, 8 mm, 9 mm, 10 mm, and any ranges between the specified values. In certain embodiments, the chopped glass fiber can have a diameter of from about 0.1 μm to 10 μm, from about 0.5 μm to 9 μm, or from about 1 μm to 8 μm. In certain embodiments, the chopped glass fiber can have a diameter of about 0.1 μm, 0.5 μm, 1 μm, 2 μm, 3 μm, 4 μm, 5 μm, 6 μm, 7 μm, 8 μm, 9 μm, 10 μm, and any ranges between the specified values. The length of the chopped glass fiber can be measured via optical microscopy. The diameter of the chopped glass fiber can be measured via scanning electron microscopy.

One preferred embodiment is directed to a precursor part essentially made of chopped glass fibers in a PEKK matrix having a T:I ratio of 50:50 to 85:15, at a loading level of chopped glass fiber of 10-45%, or 15-40%, or 20-35% by weight based on the total weight of the PEKK matrix and chopped glass fibers.

More preferred embodiments are directed to a precursor part essentially made of chopped glass fibers in a PEKK matrix having a T:I ratio of 55:45 to 78:22, notably a T:I ratio of about 60:40 or of about 70:30, at a loading level of chopped glass fibers of 20% to 45% by weight, notably of 25% to 40% by weight, based on the total weight of the PEKK matrix and the chopped glass fibers.

In certain embodiments, the inorganic additive can be one or more of a group IV, V, or VI carbide, silicide, boride, and nitride. In certain embodiments, the inorganic additive can be in powder form. In certain embodiments, the average particle size of the powder can be from about 0.01 μm to 500 μm, from about 0.1 μm to 250 μm, from about 1 μm to 100 μm, or from about 2 μm to 50 μm. In certain embodiments, the average particle size of the powder can be 0.01 μm, 0.1 μm, 0.5 μm, 1 μm, Sum, 10 μm, 15 μm, 20 μm, 25 μm, 30 μm, 40 μm, 50 μm, 75 μm, 100 μm, 250 μm, 500 μm, or any ranges between the specified values.

In certain embodiments, the reinforcing additive can comprise a dispersing agent. By dispersing agent is meant any moiety that improves separation of additives/particles and/or prevents clumping or settling. In certain embodiments, the dispersing agent can be an organosilicate, oganozirconate, organoaluminate, or oraganotitanate. In certain embodiments, dispersing agent can have an average particle size of from about 1 nm to 500 nm, from about 2 nm to 250 nm, or from 3 nm to 100 nm. In certain embodiments, dispersing agent can have an average particle size of about 1 nm, 2 nm, 3 nm, 5 nm, 10 nm, 15 nm, 20 nm, 25 nm, 30 nm, 40 nm, 50 nm, 75 nm, 100 nm, 250 nm, 500 nm, or any ranges between the specified values. Particle size can be determined by scanning electron microscopy of the dispersing agent.

As regards to reinforcing materials considered as fibrous materials, mention may be made of several fibers, uni directional rovings or continuous filament mat, fabrics, felts or nonwovens that may be in the form of strips, laps, braids, locks or pieces. The fibrous material may have various forms and dimensions, either one-dimensional, two-dimensional or three-dimensional. The fibrous material generally comprises an assembly of one or more long fibers or continuous fibers. When the fibres are continuous, their assembly forms fabrics.

The one-dimensional form corresponds to linear long fibers. The fibers may be discontinuous or continuous. The fibers may be arranged randomly or parallel to each other, in the form of a continuous filament. A fiber is defined by its aspect ratio, which is the ratio between the length and diameter of the fiber. The fibers of the fibrous material are long fibers or continuous fibers. These fibers generally have an aspect ratio of at least 1000, preferably at least 1500, more preferably at least 2000, advantageously at least 3000 and more advantageously at least 5000, even more advantageously at least 6000, more advantageously still at least 7500 and most advantageously at least 10 000.

The two-dimensional form corresponds to nonwoven or woven fibrous mats or reinforcements or bundles of fibers, which may also be braided. Even if the two-dimensional form has a certain thickness and consequently in principle a third dimension, it is considered as two-dimensional according to the present invention.

The three-dimensional form corresponds, for example, to nonwoven fibrous mats or reinforcements or stacked or folded bundles of fibers or mixtures thereof, an assembly of the two-dimensional form in the third dimension.

In certain embodiments, the long or continuous fibers may be one or more of carbon, glass, silica, boron, natural fibers, and polymeric fibers and mixtures thereof. In certain embodiments, the natural fibers can be one or more of cellulose, bamboo, hemp, and jute. In certain embodiments, the polymeric fibers can be one or more of polyamide, polyimides, polyaramid, polyurethane, polyester, and polyurethane, and mixtures thereof.

Preferably, the fibrous material is chosen from mineral fibers. More preferably the fibrous substrate is chosen from glass fibers or carbon fibers.

The fibers of the fibrous material may have a diameter between 0.005 μm and 100 μm, preferably between 1 μm and 50 μm, more preferably between 5 μm and 30 μm and advantageously between 10 μm and 25 μm.

The fibers of the fibrous material have a fiber length of >5 mm. In some embodiments, the fibers of the fibrous material have of >10 mm, or >15 mm, or >20 mm. In most cases, the fibers of the fibrous material have a fiber length of >20 mm.

In certain embodiments, the fibrous material can be present in an amount of from about 40% to about 80% by weight based on the weight of the resin of the provided precursor part. In certain embodiments, the fibrous material can be present in an amount of from about 45% to about 75% by weight based on the weight of the resin. In certain embodiments, the fibrous material can be present in an amount of from about 50% to about 70% by weight based on the weight of the resin.

One preferred embodiment is directed to a precursor part essentially made of continuous carbon fibers in a PEKK matrix having a T:I ratio of 50:50 to 85:15, at a loading level of continuous carbon fibers of 40-80%, or 45-75%, or 50-70% by weight based on the total weight of the PEKK matrix and continuous carbon fibers.

More preferred embodiments are directed to a precursor part essentially made of continuous carbon fibers in a PEKK matrix having a T:I ratio of 55:45 to 78:22, notably a T:I ratio of about 60:40 or of about 70:30, at a loading level of continuous carbon fibers of 40% to 80% by weight, notably of 45% to 75%, or 50% to 70% by weight, based on the total weight of the PEKK matrix and continuous carbon fibers.

One other preferred embodiment is directed to a precursor part essentially made of continuous glass fibers in a PEKK matrix having a T:1 ratio of 50:50 to 85:15, at a loading level of continuous glass fibers of 40-80%, or 45-75%, or 50-70% by weight based on the total weight of the PEKK matrix and continuous glass fibers.

More preferred embodiments are directed to a precursor part essentially made of continuous glass fibers in a PEKK matrix having a T:1 ratio of 55:45 to 78:22, notably a T:1 ratio of about 60:40 or of about 70:30, at a loading level of continuous glass fibers of 40% to 80% by weight, notably of 45% to 75%, or 50% to 70% by weight, based on the total weight of the PEKK matrix and continuous glass fibers.

Method of Manufacturing a High-Temperature Composite

The present disclosure is directed to a method for preparing a carbon carbon-composite, carbon fiber reinforced ceramic matrix composite, ceramic fiber reinforced ceramic matrix composite, or a carbon silica composite.

The method for preparing a carbon-carbon composite, carbon fiber reinforced ceramic matrix composite, ceramic fiber reinforced ceramic matrix composite, or a carbon silica composite comprises:

a. providing a precursor part comprising a resin comprising a poly(aryl ether ketone) (PAEK) and at least one reinforcing material,
b. pyrolyzing the precursor part to make a pyrolyzed part,
c. infusing a liquid second resin into the pyrolyzed part to make an infused part, and
d. pyrolyzing the infused part to make the carbon-carbon composite, carbon fiber reinforced ceramic matrix composite, ceramic fiber reinforced ceramic matrix composite, or the carbon silica composite, and
e. optionally repeating steps (c) through (d) one or more times.

In certain embodiments, the present disclosure is directed to the carbon-carbon composite, carbon fiber reinforced ceramic matrix composite, ceramic fiber reinforced ceramic matrix composite, or carbon silica composite made by the method above.

The inventors have surprisingly found that a sufficiently high degree of crystallinity of the resin was necessary to limit bloating during the pyrolyzing, notably during the pyrolyzing of the precursor part. More precisely, they have found that the degree of crystallinity of the precursor part has to be of 10% or more of crystallized resin based on the total weight of the resin enabled an efficient mitigation of bloating during the pyrolyzing steps, notably during the pyrolyzing of the precursor part. The degree of crystallinity refers to the weight amount of crystallized resin compared to the total weight of the resin of the provided precursor part and is preferably assessed thanks to a DSC measurement of the enthalpy of melt on first heat, with a temperature ramp of 20° C./min, a correlation between an enthalpy of a well-crystallized reference resin (the same resin as the one of the precursor part) and its degree of crystallinity, as measured by WAXS, being available from the literature or easily determined by the skilled person.

One preferred embodiment is directed to a precursor part having a degree of crystallinity of 15% or more.

According to some embodiments, the precursor part may have a crystallinity of 16% or more, or of 17% or more, or of 18% or more, or of 19% or more, or of 20% or more.

According to the invention, during the pyrolyzing, a temperature within a chamber increases at a rate of from about 1° C./h to about 20° C./h up to a peak temperature of about 1000° C.

In certain embodiments, during the pyrolyzing the temperature within the chamber can increase at a rate of from about 3° C./h to about 17° C./h. In certain embodiments, during the pyrolyzing, the temperature within the chamber can increase at a rate of from about 5° C./h to about 15° C./h. In certain embodiments, pyrolysis conditions during pyrolyzing step b. are the same as the pyrolysis conditions during pyrolyzing step d. In certain embodiments, the pyrolysis conditions during pyrolyzing step b. are different than the pyrolysis conditions during pyrolyzing step d.

In certain embodiments, during the pyrolyzing, a temperature within a chamber can increase at a rate of from about 1° C./h, 2° C./h, 3° C./h, 4° C./h, 5° C./h, 6° C./h, 7° C./h, 8° C./h, 9° C./h, 10° C./h, 11° C./h, 12° C./h, 13° C./h, 14° C./h, 15° C./h, 16° C./h, 17° C./h, 18° C./h, 19° C./h, 20° C./h, or any ranges between the specified values.

In certain embodiments, during the pyrolyzing of the precursor part, the temperature within the chamber increases one or more times at a rate of 10° C./h or more at a temperature below 450° C., or at a temperature below 400° C.

In certain embodiments, during the pyrolyzing of the precursor part, the temperature within the chamber increases one or more times at a rate of 10° C./h or more at a temperature above 600° C., or at a temperature above 650° C. or more.

In certain embodiments, during the pyrolyzing of the precursor part, the temperature within the chamber increases one or more times at a rate of less than 10° C./h between 400° C. and 650° C., or between 450° C. and 600° C. In particular the temperature within the chamber can increase at a rate of from about 1° C./h, 2° C./h, 3° C./h, 4° C./h, 5° C./h, 6° C./h, 7° C./h, 8° C./h, 9° C./h, 10° C./h between 400° C. and 650° C., or from 450° C. and 600° C.

In preferred embodiments, during the pyrolyzing of the precursor part the temperature within the chamber increases one or more times at a rate of 10° C./h or more at a temperature below 400° C., at a rate of less than 10° C./h between 450° C. and 600° C., and at a rate of 10° C./h or more at a temperature above 650° C.

In certain embodiments, during the pyrolyzing of the precursor part the temperature within the chamber increases one or more times at a rate of from 10° C./h to 15° C./h at a temperature below 400° C., at a rate of from 2° C./h to 5° C./h between 450° C. and 600° C., and at a rate of from 10° C./h to 15° C./h at a temperature above 650° C.

In certain embodiments, the pyrolyzing optionally can comprise temperature holds during the pyrolysis at temperatures between 120° C. and 1000° C., or between 200° C. and 1000° C., or between 400° C. and 1000° C. In certain embodiments, the pyrolysis can be performed under nitrogen, argon, or forming gas (mixture of hydrogen and nitrogen). In certain embodiments, the pyrolyzing occurs in a graphite bed. In certain embodiments, the temperature holds during the pyrolysis can be from about 1 h to 72 h, from about 2 h to 48 h, or from about 3 h to 24 h. In certain embodiments, the temperature holds (i.e., is maintained) during the pyrolysis can be about 1 h, 2 h, 3 h, 4 h, 5 h, 6 h, 7 h, 8 h, 9 h, 10 h, 12 h, 16 h, 20 h, 24 h, 30 h, 36 h, 42 h, 48 h, 54 h, 60 h, 66 h, 72 h, or any ranges between the specified values.

In certain embodiments, the pyrolyzing of the precursor part can comprise one or more temperature holds during the pyrolysis between 400° C. and 650° C., or between 450° C. and 600° C., temperatures included. In certain embodiments, the pyrolysis of the precursor part can be performed under nitrogen, argon, or forming gas (mixture of hydrogen and nitrogen). In certain embodiments, the pyrolyzing of the precursor part occurs in a graphite bed. In certain embodiments, the temperature holds during the pyrolysis can be from about 1 h to 72 h, from about 2 h to 48 h, or from about 3 h to 24 h. In certain embodiments, the temperature holds (i.e., is maintained) during the pyrolysis of the precursor part can be about 1 h, 2 h, 3 h, 4 h, 5 h, 6 h, 7 h, 8 h, 9 h, 10 h, 12 h, 16 h, 20 h, 24 h, 30 h, 36 h, 42 h, 48 h, 54 h, 60 h, 66 h, 72 h, or any ranges between the specified values.

In certain embodiments, the liquid second resin comprises, consists essentially of, or consists of one or more of pitch, benzoxazines, furfural, polyester, vinylester, acrylic, and phenolics. In certain embodiment, the liquid second resin comprises, consists essentially of, or consist of pitch, phenolics or combination thereof.

In certain embodiments, the method comprises repeating infusing step c. and pyrolyzing step d. at least one time. In certain embodiments, the method comprises repeating infusing step c. and pyrolyzing step d. at least two, three, four, five, or more times. In certain embodiments the char yield after a first pyrolysis cycle or after two, three, four, five, or more times can be greater than 65%, greater than 70%, greater than 75%, greater than 80%, greater than 85%, greater than 90%, or greater than 95% or more.

In certain embodiments, the method comprises repeating infusing step c. and pyrolyzing step d. until the carbon carbon composite, carbon fiber reinforced ceramic matrix composite, ceramic fiber reinforced ceramic matrix composite, or carbon silica composite is at least about 75% solid, 80% solid, 85% solid, 90% solid, 95% solid, or 99% solid as determined according to Example.

In certain embodiments, the method comprises repeating steps c. through d. one or more times.

Methods to Manufacture the Precursor Part

Below are described non-limitative methods to manufacture the precursor part.

Methods wherein the crystallization of the resin is carried out within a mold and/or under pressure are particularly preferred.

In order to reach the desired degree of crystallinity, the precursor part may be let at a temperature above the glass transition temperature and below the melt temperature of the resin for a sufficiently long time during its manufacturing process, in a manner known per se by the skilled person.

The precursor part comprises a resin comprising a poly (aryl ether ketone) (PAEK) and at least one reinforcing material.

In some embodiments, the precursor part essentially consists of, or consists of the resin and the at least one reinforcing material.

In some embodiments, in addition to the resin and the at least one reinforcing material, the precursor part may also contain some functional additives. Examples of such that may be mentioned include antistatic agents, antioxidants, melt stabilizers, conductive agents, flame retardants, colorants and also reactive agents such as alkaline carbonates. The functional additive may represent up to 5% weight based on the total weight of the precursor part.

In some embodiments, the resin essentially consists of, or consist of, the polyaryletherketone(s).

In some embodiments, in addition to the poly(aryl ether ketone(s)), the resin may also contain other thermoplastic(s). The resin may notably essentially consist of, or consist of 20% by weight or more, or 50% by weight of more, or 80% by weight or more, or 90% by weight or more, or 95% by weight or more of poly(aryl ether ketone(s)), and the other thermoplastic(s) based on the total weight of the resin.

Manufacturing Method Comprising Melt Processing

In certain embodiments, the method to manufacture the precursor part may include melt processing.

In certain embodiments, the melt processing can be one or more of injection molding, extrusion, roto-molding, compression molding, pultrusion, filament winding and fused filament fabrication printing.

Preferably, the melt processing can be one or more of injection molding, roto-molding, compression molding.

In certain embodiments, the melt processing can optionally be followed by melt forming, such as thermoforming or rod bending.

The reinforcing material may be added to polyetherketoneketone as an additive and/or as a fibrous material.

Manufacturing Method Using Aligned Materials

In certain embodiments, the method to manufacture the precursor part includes:

a1) processing an aligned reinforcing material and a resin comprising a PAEK to make an aligned reinforcing material PAEK composition to create a fabric, prepreg, or tape comprising the aligned reinforcing material and impregnated PAEK, a2) processing the fabric, prepreg, or tape comprising the aligned reinforcing material and impregnated PAEK via hand-layup, automated tape placement, 3D printing, filament winding, or needle punching, or other methods of Z-axis reinforcement followed by compression molding, vacuum bag consolidation, autoclave consolidation, in-situ consolidation to make a precursor part.

In certain embodiments, the reinforcing material is a 1-2 dimensional flake material or aligned 1-2 dimensional platelet material. It can notably be graphite, graphene, or whiskers.

In certain embodiments, the 1-2 dimensional flake material or 1-2 dimensional platelet material can have a diameter of from about 0.1 mm to 10 mm, from about 0.5 mm to 9 mm, or from about 1 mm to 8 mm. In certain embodiments, the 1-2 dimensional flake material or 1-2 dimensional platelet material can have a diameter of about 0.1 mm, 0.5 mm, 1 mm, 2 mm, 3 mm, 4 mm, 5 mm, 6 mm, 7 mm, 8 mm, 9 mm, 10 mm, and any ranges between the specified values. In certain embodiments, the 1-2 dimensional flake material or 1-2 dimensional platelet material can have a thickness of from about 0.001 mm to 0.1 mm, from about 0.005 mm to 0.09 mm, or from about 0.01 mm to 0.08 mm. In certain embodiments, the 1-2 dimensional flake material or 1-2 dimensional platelet material can have a thickness of about 0.001 mm, 0.005 mm, 0.01 mm, 0.02 mm, 0.03 mm, 0.04 mm, 0.05 mm, 0.06 mm, 0.07 mm, 0.08 mm, 0.09 mm, 0.1 mm, and any ranges between the specified values. Measurements can be obtained from optical or scanning electron microscopy imaging before melt compounding.

In certain embodiments, the processing can create a fabric comprising the aligned reinforcing material and impregnated PAEK. In certain embodiments, the processing can create a prepreg comprising the aligned reinforcing materials and impregnated PAEK. In certain embodiments, the processing can create a tape comprising the aligned reinforcing materials and impregnated PAEK.

In certain embodiments, aligned reinforcing material can be made by stretching unidirectional tape until the fibers are broken, subjecting the fibers to fluid flow to align the fibers, or subjecting the fibers to electro-magnetic fields to align the fibers. In certain embodiments, the aligned reinforcing additives can be made by stretching unidirectional tape until the fibers are broken (either before or after impregnation with PAEK resin). In a preferred embodiment the fibers are aligned by fluid flow onto a porous belt to create a mat of aligned fibers as described in U.S. Pat. No. 10,669,659.

In certain embodiments, the aligned reinforcing material can be one or more of carbon, glass, silica, boron, natural fibers, polymeric fibers, carbon nanotubes, graphite, graphene, and carbon or ceramic whiskers. In certain embodiments, the natural fibers can be one or more of cellulose, bamboo, hemp, and jute. In certain embodiments, the polymeric fibers can be one or more of polyamide, polyimides, polyaramid, polyurethane, polyester, and polyurethane.

In certain embodiments, the aligned reinforcing material can have a length of from about 0.1 mm to 10 mm, from about 0.5 mm to 9 mm, or from about 1 mm to 8 mm. In certain embodiments, the aligned reinforcing additive can have a fiber length of about 0.1 mm, 0.5 mm, 1 mm, 2 mm, 3 mm, 4 mm, 5 mm, 6 mm, 7 mm, 8 mm, 9 mm, 10 mm, and any ranges between the specified values.

In certain embodiments, the aligned reinforcing material and the resin comprising a PAEK are processed in step a1) together with one or more one or more other reinforcing additives.

In certain embodiments, the in-situ consolidation can contain rolling to apply pressure and/or heat.

Manufacturing Method Using Tape(s) or Fabrics

In certain embodiments, the method to manufacture the precursor part of step (a) is made by:

a1) providing one or more tapes made of a fibrous material impregnated with a resin comprising a poly (aryl ether ketone) (PAEK) and optionally containing one or more reinforcing additives, or providing one or more fabrics made by co-weaving a fibrous material with a fiber comprising PAEK and optionally containing one or more other reinforcing additives; and a2) processing the provided tape(s) or fabrics via one or more the following methods: hand-layup, automated tape placement, 3D printing, filament winding, needle punching, and other methods of Z-axis reinforcement followed by one or more compression molding, vacuum bag consolidation, autoclave consolidation, and in-situ consolidation, to make the precursor part.

In certain embodiments, the fibrous material is made of carbon fiber.

In certain embodiments, the in-situ consolidation can contain rolling to apply pressure and/or heat.

Method Comprising Impregnating the Tapes of Fabrics

In certain embodiments, the method to manufacture the precursor part includes:

a1) impregnating a tape or fabric made of a fibrous material impregnated with a resin comprising a poly (aryl ether ketone) (PAEK), with a resin comprising a poly(aryl ether ketone) (PAEK) and at least one reinforcing additive to make a filled PAEK tape or fabric, a2) processing the filled PAEK tape or fabric or co-woven PAEK/fiber material via hand-layup, automated tape placement, 3D printing, filament winding or needle punching, or other methods of Z-axis reinforcement followed by compression molding, vacuum bag consolidation, autoclave consolidation, or in-situ consolidation to make a precursor part, In certain embodiments, the fibrous material is made of carbon fiber.

In certain embodiments, the reinforcing additive can be one or more of a carbonaceous additive, a chopped fiber, dispersing agents, and an inorganic additive.

In certain embodiments, the reinforcing additive can be present in an amount of from about 0.01% to about 30% by weight of the total weight of resin and reinforcing additive. In certain embodiments, the reinforcing additive can be present in an amount of from about 0.1% to about 25% by weight of the total weight of resin and reinforcing additive. In certain embodiments, the reinforcing additive can be present in an amount of from about 1% to about 20% by weight of the total weight of resin and reinforcing additive.

In certain embodiments, the reinforcing additive can be present in an amount of about 0.01%, 0.05%, 0.1%, 0.5%, 1%, 2%, 3%, 4%, 5%, 6%, 7%, 8%, 9%, 10%, 15%, 20%, 25%, 30% by weight, or any ranges between the specified values, based on the total weight of the resin and reinforcing additive.

In certain embodiments, the additive can be a carbonaceous additive. In certain embodiments, the carbonaceous additive can be one or more of carbon fiber, carbon nanotubes, graphite, graphene, carbon whisker, a fullerene, carbon black, carbon flake, and buckyballs. In certain embodiments, the carbonaceous additive can be aligned by shear from the melt processing.

In certain embodiments, the carbonaceous additive can have a length of from about 0.1 mm to 10 mm, from about 0.5 mm to 9 mm, or from about 1 mm to 8 mm. In certain embodiments, the carbonaceous additive can have a length of about 0.1 mm, 0.5 mm, 1 mm, 2 mm, 3 mm, 4 mm, 5 mm, 6 mm, 7 mm, 8 mm, 9 mm, 10 mm, and any ranges between the specified values. In certain embodiments, the carbonaceous additive can have a diameter of from about 0.1 μm to 10 μm, from about 0.5 μm to 9 μm, or from about 1 μm to 8 μm. In certain embodiments, the carbonaceous additive can have a diameter of about 0.1 μm, 0.5 μm, 1 μm, 2 μm, 3 μm, 4 μm, Sum, 6 μm, 7 μm, 8 μm, 9 μm, 10 μm, and any ranges between the specified values.

In certain embodiments, the additive can be a chopped fiber. In certain embodiments, the chopped fiber comprises one or more of carbon, glass, silica, boron, natural fibers, and polymeric fibers. In certain embodiments, the natural fibers can be one or more of cellulose, bamboo, hemp, and jute. In certain embodiments, the polymeric fibers can be one or more of polyamide, polyimides, polyaramid, polyurethane, polyester, and polyurethane.

In certain embodiments, the chopped fiber is a chopped carbon fiber. The one or more carbon fibers can have a fiber length of from about 0.1 mm to 10 mm, from about 0.5 mm to 9 mm, or from about 1 mm to 8 mm. In certain embodiments, the chopped carbon fiber can have a fiber length of about 0.1 mm, 0.5 mm, 1 mm, 2 mm, 3 mm, 4 mm, 5 mm, 6 mm, 7 mm, 8 mm, 9 mm, 10 mm, and any ranges between the specified values. In certain embodiments, the chopped carbon fiber can have a diameter of from about 0.1 μm to 10 μm, from about 0.5 μm to 9 μm, or from about 1 μm to 8 μm. In certain embodiments, the chopped carbon fiber can have a diameter of about 0.1 μm, 0.5 μm, 1 μm, 2 μm, 3 μm, 4 μm, 5 μm, 6 μm, 7 μm, 8 μm, 9 μm, 10 μm, and any ranges between the specified values.

In certain embodiments, the additive can be an inorganic additive. In certain embodiments, the inorganic additive can be one or more of a group IV, V, or VI carbide, silicides, boride, and nitride. Carbides and silicides would be preferred with silicon carbide being the most preferred. In certain embodiments, the inorganic additive can be in powder form. In certain embodiments, the average particle size of the powder can be from about 0.01 μm to 500 μm, from about 0.1 μm to 250 μm, from about 1 μm to 100 μm, or from about 2 μm to 50 μm. In certain embodiments, the average particle size of the powder can be 0.01 μm, 0.1 μm, 0.5 μm, 1 μm, Sum, 10 μm, 15 μm, 20 μm, 25 μm, 30 μm, 40 μm, 50 μm, 75 μm, 100 μm, 250 μm, 500 μm, or any ranges between the specified values.

In certain embodiments, the additive can comprise a dispersing agent. In certain embodiments, the dispersing agent can be an organosilicate, oganozirconate, organoaluminate, or oraganotitanate, with organosilicates and organotitanates being preferred and organosilicates being the most preferred. In certain embodiments, dispersing agent can have an average pore size of from about 1 nm to 500 nm, from about 2 nm to 250 nm, or from 3 nm to 100 nm. In certain embodiments, dispersing agent can have an average pore size of about 1 nm, 2 nm, 3 nm, 5 nm, 10 nm, 15 nm, 20 nm, 25 nm, 30 nm, 40 nm, 50 nm, 75 nm, 100 nm, 250 nm, 500 nm, or any ranges between the specified values.

In certain embodiments, the in-situ consolidation can contain rolling to apply pressure and/or heat.

EXAMPLES

The method and products described herein are now further detailed with reference to the following examples. These examples are provided for the purpose of illustration only and the embodiments described herein should in no way be construed as being limited to these examples. Rather, the embodiments should be construed to encompass any and all variations which become evident as a result of the teaching provided herein.

Manufacturing Samples

Sample 1 and Sample 2 were made of a PEKK adapted for injection molding having a T/I ratio of 70/30. Two 4 mm-thick plates were obtained by injection molding on a Wittman-Battenfeld press in conditions enabling to obtain two different crystallinities for the molded part.

For sample 1, the machine operator used the following parameters: alimentation 335° C.; Nozzle: 360° C.; Mold 80° C., and holding time:15 s. A crystallinity of 0%, obtained by wide-angle X-ray scattering was measured on the molded part.

For sample 2, the machine operator used the following parameters: alimentation 330° C.; Nozzle: 350° C.; Mold 235° C., and holding time: 60 s. A crystallinity of 16%, obtained by wide-angle X-ray scattering was measured on the molded part.

Samples 3 and 4 were made of PEKK with varying T/I ratio and continuous carbon fibres. They were obtained as follows: sixteen plies of tapes made of PEKK having 67% wt continuous carbon fibres tapes were assembled with a [0/90]4 s orientation. They were pressed and consolidated at 380° C. for 1 h with a pressure of 10 bars. Their dimension after consolidation was: 50 mm×50 mm×3 mm. A crystallinity, assessed by measuring the enthalpy of melt at 20° C./min on first heat, of 20% was measured on sample 3 and a crystallinity, assessed by measuring the enthalpy of melt at 20° C./min on first heat, of 6% was measured on sample 4. The values of the degrees of crystallinity were calculated after a calibration has been made as follows: i) neat PEKKs used for sample 3, respectfully sample 4, were annealed for 24 hours at 250° C., ii) their respective enthalpies were measured on first heat, with a temperature ramp of 20° C./min, iii) their crystallinities were measured by WAXS, in order to iv) assess their respective % $C_{ref}/\Delta H_{ref}$ values.

Table 1 below summarizes the main distinguishing features of samples 1-4:

TABLE 1

| Sample | Polymer | T/I ratio | Reinforcing material | Degree of crystallinity |
|---|---|---|---|---|
| 1 | PEKK | 70/30 | — | 0% |
| 2 | PEKK | 70/30 | — | 15% |
| 3 | PEKK | 70/30 | Continuous carbon fibres | 20% |
| 4 | PEKK | 60/40 | Continuous carbon fibres | 6% |

Pyrolyzing Samples

Samples 1-4 were pyrolyzed in a quartz crucible in a muffle furnace in an inert environment undergoing the pyrolysis cycle as described in Table 2.

| Step | Temperature (° C.) | Time (hours) | Temperature ramp (° C./hour) |
|---|---|---|---|
| 1 | 23-120 | 2 | 47.5 |
| 2 | hold 120 | 2 | — |
| 3 | 120-450 | 24 | 13.8 |
| 4 | hold 450 | 4 | — |
| 5 | 450-600 | 48 | 3.1 |
| 6 | hold 600 | 4 | — |
| 7 | 600-1000 | 28 | 14.3 |
| 8 | hold 1000 | 3 | — |
| | Total time (hours) | 115 | |

Samples 1-4 were weighed and their thickness (t) was measured before and after pyrolysis to calculate char yield and determine dimensional change ("Table 3").

Char yield was calculated from the mass of each sample pre and post pyrolysis ("Equation 1"):

$$\text{char yield (\%)} = \frac{w_a}{w_b} \times 100$$

where $w_b$ and $w_a$ are the mass of the sample before and after pyrolysis respectively. The parameter Δt was calculated by doing the difference between the thickness after the pyrolysis and the thickness, at 25° C. before the pyrolysis, divided by the thickness, at 25° C. before the pyrolysis, expressed as a percentage.

TABLE 3

| Sample | Char Yield | Δt |
|---|---|---|
| 1 | 66.8% | 107.3% |
| 2 | 69.0% | 12.1% |
| 3 | 86.5% | 25.6% |
| 4 | 83.7% | 110% |

CONCLUSION

A sufficiently crystallized PEKK resin shows much lower bloating and slightly higher char yield when pyrolyzed compared to amorphous or insufficiently crystallized PEKK resin. This has been shown on the resin itself (sample 2 versus sample 1) and on a precursor part containing continuous carbon fibers (sample 3 versus sample 2).

A precursor part could be made from sample 2 by adding a reinforcing additive prior or during the injection molding step.

What is claimed is:

1. A method for making a high temperature composite, which is a carbon carbon composite, carbon fiber reinforced ceramic matrix composite, ceramic fiber reinforced ceramic matrix composite, or a carbon silica composite, comprising:

a. providing a precursor part comprising a resin comprising a poly (aryl ether ketone) (PAEK) and at least one reinforcing material, wherein the resin has a degree of crystallinity of 10% or more;

b. pyrolyzing the precursor part to a pyrolyzed part;

c. infusing a liquid second resin into the pyrolyzed part to make an infused part; and d. pyrolyzing the infused part to make the carbon carbon composite, carbon fiber reinforced ceramic matrix composite, ceramic fiber reinforced ceramic matrix composite, or the carbon silica composite, optionally repeating steps c. through d. one or more times.

2. The method according to claim 1, wherein during the pyrolyzing of step b., a temperature within a chamber increases to a peak temperature of about 1000° C. or more, wherein said temperature within the chamber increases one or more times at a rate from 1° C./h to about 20° C./h during said pyrolyzing, and wherein optionally said pyrolyzing is maintained for a period of time at one or more temperatures.

3. The method according to claim 1, wherein during the pyrolyzing of the precursor part, the temperature within the chamber increases one or more times at a rate of less than 10° C./h between 450° C. and 600° C., and is optionally maintained for a period of time at one or more temperatures between 450° C. and 600° C., endpoints included.

4. The method according to claim 1, wherein during the pyrolyzing of the precursor part, the temperature within the chamber increases one or more times at a rate of 10° C./h or more at temperatures below 400° C. and/or above 650° C.

5. The method according to claim 1, wherein the liquid second resin comprises one or more of pitch, benzoxazines, furfural, polyester, vinylester, acrylic, and phenolics.

6. The method according to claim 1, wherein the precursor part of step (a) is made by melt processing the resin comprising the poly (aryl ether ketone) and the at least one reinforcing material.

7. The method according to claim 1, wherein the reinforcing material comprises one or more reinforcing additives chosen from a group consisting of a carbonaceous additive, a chopped fiber, an inorganic additive, a fibrous material comprising long fibers, continuous fibers, and mixtures thereof.

8. The method according to claim 1, wherein the poly (aryl ether ketone) (PAEK) is a poly(ether ketone ketone) consisting essentially of a terephthalic repeating unit and an isophthalic repeating unit, the terephthalic repeating unit having the formula ("T unit"):

(I)

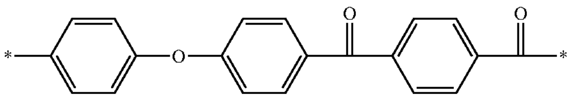

the isophthalic repeating unit having the formula ("I unit"):

(II)

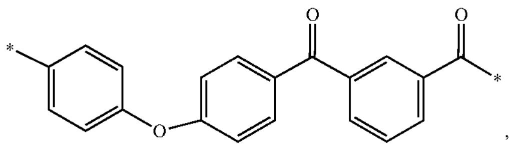

, wherein the Formula I: Formula II (T:I) isomer ratio in the polyetherketoneketone ranges advantageously from 50:50 to 85:15.

9. A method for making a pyrolized precursor part, the method comprising:

a. making a precursor part from a resin comprising a polyaryletherketone (PAEK) and at least one reinforcing additive;

b. pyrolyzing the precursor part to a pyrolyzed part in a chamber;

wherein during the pyrolyzing of the precursor part, the temperature within the chamber increases one or more times at a rate from 1° C./h to less than 10° C./h between 450° C. and 600° C., and is optionally maintained for a period of time at one or more temperatures between 450° C. and 600° C., endpoints included, and wherein during the pyrolyzing of the precursor part, the temperature within the chamber increases one or more times at a rate of 10° C./h to about 20° C./h at temperatures above 650° C.

10. The method according to claim 9, wherein during the pyrolyzing, a temperature within a chamber increases to a peak temperature of about 1000° C. or more.

11. The method according to claim 9, wherein the precursor part of step (a) is made by melt processing the resin comprising the poly (aryl ether ketone) and the at least one reinforcing material.

12. The method according to claim 9, wherein the reinforcing material comprises one or more reinforcing additives chosen from a group consisting of a carbonaceous additive, a chopped fiber, an inorganic additive, a fibrous material comprising long fibers, continuous fibers, and mixtures thereof.

13. The method according to claim 9, wherein the reinforcing material comprises a carbonaceous additive being one or more of carbon fiber, carbon nanotubes, graphite, graphene, carbon whisker, a fullerene, carbon black, carbon flake, buckyballs, and mixtures thereof.

14. The method according to claim 9, wherein the reinforcing material comprises a chopped, long, or continuous fiber being one or more of carbon, glass, silica, boron, natural fibers, polymeric fibers, and mixtures thereof.

15. The method according to claim 9, wherein the reinforcing material is a long or continuous carbon fiber or a long or continuous glass fiber.

16. The method according to claim 9, wherein the poly (aryl ether ketone) (PAEK) is a poly(ether ketone ketone) consisting essentially of a terephthalic repeating unit and an isophthalic repeating unit, the terephthalic repeating unit having the formula ("T unit"):

(I)

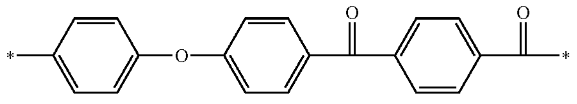

the isophthalic repeating unit having the formula ("I unit"):

(II)

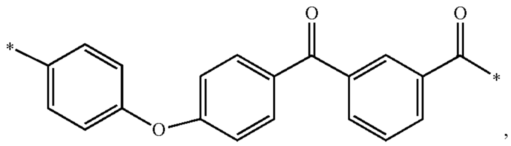

, wherein the Formula I: Formula II (T:I) isomer ratio in the polyetherketoneketone ranges advantageously from 50:50 to 85:15.

17. The method according to claim 9, wherein the poly (aryl ether ketone) (PAEK) is a poly(ether ketone ketone) consisting essentially of a terephthalic repeating unit and an isophthalic repeating unit, the terephthalic repeating unit having the formula ("T unit"):

(I)

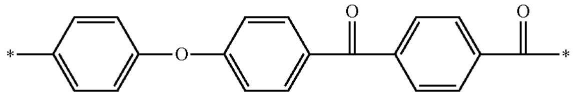

the isophthalic repeating unit having the formula ("I unit"):

(II)

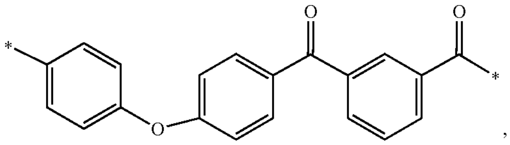

, wherein the Formula I: Formula II (T:I) isomer ratio in the polyetherketoneketone ranges advantageously from 52:48 to 78:22.

18. The method according to claim 1, wherein the poly (aryl ether ketone) (PAEK) is a poly(ether ketone ketone) consisting essentially of a terephthalic repeating unit and an isophthalic repeating unit, the terephthalic repeating unit having the formula ("T unit"):

(I)

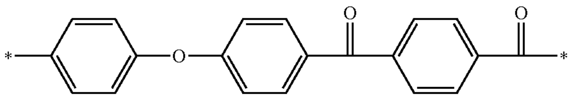

the isophthalic repeating unit having the formula ("I unit"):

(II)

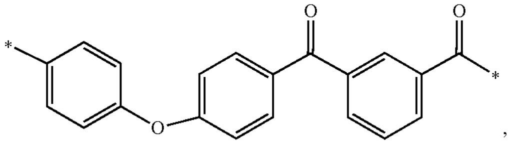

, wherein the Formula I: Formula II (T:I) isomer ratio in the polyetherketoneketone ranges advantageously from 52:48 to 78:22.

19. The method according to claim 1, wherein during the pyrolyzing of the precursor part, the temperature within the chamber increases one or more times at a rate of less than 10° C./h between 450° C. and 600° C., and is optionally maintained for a period of time at one or more temperatures between 450° C. and 600° C., endpoints included, and wherein during the pyrolyzing of the precursor part, the temperature within the chamber increases one or more times at a rate of 10° C./h or more at temperatures above 650° C.

20. The method according to claim 1, wherein the resin has a degree of crystallinity of 15% or more.

21. The method according to claim 1, wherein during the pyrolyzing of step b., a temperature within a chamber increases to a peak temperature of about 1000° C. or more, wherein said temperature within the chamber increases one or more times at a rate from 1° C./h to about 17° C./h during said pyrolyzing, and wherein optionally said pyrolyzing is maintained for a period of time at one or more temperatures.

* * * * *